United States Patent [19]
Dake et al.

[11] Patent Number: 5,424,082
[45] Date of Patent: Jun. 13, 1995

[54] CALCIUM AND VITAMIN C CONTAINING BEVERAGE PRODUCTS WITH IMPROVED COLOR STABILITY

[75] Inventors: Timothy W. Dake, Cincinnati; Donald R. Kearney, Fairfield; Sanford T. Kirksey, Forest Park; Larry E. Meyer, Cincinnati, all of Ohio

[73] Assignee: The Proctor & Gamble Company, Cincinnati, Ohio

[21] Appl. No.: 205,302

[22] Filed: Mar. 3, 1994

[51] Int. Cl.$^6$ .................. A23L 1/302; A23L 1/304
[52] U.S. Cl. ............................ 426/72; 426/74; 426/590; 426/599; 426/650; 426/658
[58] Field of Search ............. 426/72, 74, 590, 599, 426/650, 658

[56] References Cited

U.S. PATENT DOCUMENTS

| | | | |
|---|---|---|---|
| 2,159,986 | 5/1939 | Gray et al. | 99/163 |
| 2,475,838 | 7/1949 | Johnson et al. | 99/103 |
| 2,628,905 | 2/1953 | Antle et al. | 99/154 |
| 3,652,290 | 3/1972 | Hammes et al. | 99/28 |
| 3,734,742 | 5/1973 | Morse et al. | 99/28 |
| 3,958,017 | 5/1976 | Morse et al. | 426/72 |
| 4,163,807 | 8/1979 | Jackman | 426/599 |
| 4,476,112 | 10/1984 | Aversano | 424/127 |
| 4,551,342 | 11/1985 | Nakel et al. | 426/548 |
| 4,722,847 | 2/1988 | Heckert | 426/74 |
| 4,737,375 | 4/1988 | Nakel et al. | 426/590 |
| 4,871,554 | 10/1989 | Kalala et al. | 426/74 |
| 4,919,963 | 4/1990 | Heckert | 426/599 |
| 4,937,085 | 6/1990 | Cherry et al. | 426/269 |
| 4,959,230 | 9/1990 | Wyss et al. | 426/102 |
| 4,975,293 | 12/1990 | Hicks et al. | 426/271 |
| 4,988,522 | 1/1991 | Warren | 426/268 |
| 5,028,446 | 7/1991 | Saleeb et al. | 426/590 |

FOREIGN PATENT DOCUMENTS 59-203481 11/1984 Japan .................. A23L 2/38

OTHER PUBLICATIONS

Nolte et al., "*Experiments with Antioxidants for Preventing Flavor Deterioration in Canned Orange Juice*", Food Research, vol. 7, Jan.–Dec., 1942, pp. 236–243.
Gardner, Wm. Howlett, "*Diluted Fruit Juice Drinks*", Food Acidulants, Allied Chemical Corporation, (1966), pp. 110–113.
Kacem et al., "*Nonenzymatic Browning in Aseptically Packaged Orange Drinks: Effects of Ascorbic Acid, Amino Acids and Oxygen*", Journal of Food and Science, vol. 52, No. 6, (1987), pp. 1668–1672.
Esselen, Jr. et al., "*d–Isoascorbic Acid as an Antioxidant*", Industrial and Engineering Chemistry, vol. 37, No. 3, (Mar., 1945), pp. 295–299.
Bauernfeind et al. "*Food Processing with Added Ascorbic Acid, XVI. L–Ascorbic Acid vs. Erythorbic Acid*", Advances in Food Research, vol. 18, Academic Press, NY (1970), pp. 220–236, 277–292, 297–304.
McEvily et al. "*Inhibition of Enzymatic Browning in Foods and Beverages*", Critial Reviews in Food Science and Nutrition, 1992, pp. 253–267.
Moore, Edwin Lewis, "*An Investigation of the Factos Involved in the Deterioration of Glass-Packed Orange Juice*", Thesis submitted for degree of Doctor of Philosophy, (May, 1942), pp. 6–30.
Borenstein, B., "*The Comparative Properties of Ascorbic Acid and Erythorbic Acid*", Food Technology, Nov., 1965, pp. 115–117.
Katayama et al., "*The Effects of Adding D–Iso–Ascorbic Acid to Fruit Juice*", Kanzume Jiho, vol. 42, No. 10 (1963), pp. 1–15.

*Primary Examiner*—Helen Pratt
*Attorney, Agent, or Firm*—Rose Ann Dabek; M. B. Graff; J. C. Rasser

[57] ABSTRACT

The present invention relates to beverage compositions containing calcium and Vitamin C, exhibiting reduced browning. The beverage compositions comprise:
  a) from about 50 ppm to about 2000 ppm ascorbic acid;
  b) from about 100 ppm to about 2,000 ppm erythorbic acid;
  c) From about 0.03% to about 0.19% calcium;
  d) a pH control system comprising an acidic buffering component, such that the pH of the composition is from about 3.1 to about 4.5;
  e) from 0% to about 60% of a flavoring system;
  f) an effective amount of a sweetening component; and
  g) water.

18 Claims, No Drawings

CALCIUM AND VITAMIN C CONTAINING BEVERAGE PRODUCTS WITH IMPROVED COLOR STABILITY

FIELD OF THE INVENTION

The present invention relates to calcium and Vitamin C containing beverages.

BACKGROUND OF THE INVENTION

Vitamin and mineral supplements are recognized to be important primarily for those who have inadequate diets, including children. In order to alleviate the problem of improper diet, it has become common practice to supplement the diet with essential nutrients, such as by the use of vitamin pills, fortified beverages, and the like.

Of the several known vitamins and minerals, calcium and Vitamin C are recognized to be important. Ascorbic acid (Vitamin C) is considered one of the most essential since it plays an important role in collagen formation, teeth and bone formation and repair, and the prevention of scurvy. Ascorbic acid is found naturally in many fruits and vegetables, but the vitamin is water soluble and thus is not stored in the body for any appreciable period of time. For these reasons, ascorbic acid is commonly included in various fortified beverages now being marketed so that it may be consumed on a daily basis.

Several minerals are also necessary for complete nutrition, and calcium is one of the most vital of these elements. Calcium is the fifth most abundant element in the human body. It plays an important role in many physiological processes, including nerve and muscle functions. Calcium deficiency can interfere with muscular contraction and can also result in depletion of skeletal calcium. Osteoporosis is a recognized nutritional problem, and numerous calcium fortified compositions are presently being marketed in an attempt to overcome this problem.

For the foregoing reasons, it is apparent that any nutritionally complete diet should contain ascorbic acid and calcium, as well as other recognized vitamins and minerals. Food scientists and nutritionists would like to increase the present day average consumption of Vitamin C and calcium. Since beverages are consumed on a daily basis by many people, packaged beverages become the ideal carrier to supply an increased amount of ascorbic acid and calcium.

Although packaged beverages are excellent carriers to supply Vitamin C and calcium, the Vitamin C activity deteriorates in the package during storage and after the package is opened and is awaiting complete consumption.

It is well known that ascorbic acid, in aqueous solutions, is rapidly oxidized by oxygen in the air. Upon exposure to air ascorbic acid is oxidized to dehydroascorbic acid. Storage for prolonged periods results in further reactions (with the loss of Vitamin C activity) to degradation products. These degradation products cause discoloration and browning which detract from the appearance and saleability of the beverage product.

It is also known that certain metals such as iron and copper, catalyze the deterioration of the ascorbic acid such that it is oxidized rapidly.

Attempts have been made to overcome the problem of browning and ascorbic acid degradation by adding additional ascorbic acid, erythorbic, acid, or other antioxidant. However, there are conflicting results in the literature as to the effectiveness of additional ascorbic acid and/or erythorbic acid, see for example Esselen et. al, "d-Isoascorbic as an Antioxidant", *Journal of Industrial and Engineering Chemistry*, 37(3), 1945, Moore, E. L., "An Investigation of the Factors Involved in the Deterioration of Glass-Packed Orange Juice", doctor's dissertation, Massachusetts State College, 1942, and Bauernfeind J. C., Pinkert D. M., "Food Processing With added Ascorbic Acid", *Advances in Food Research*, 18:222-304, 1942, Katayama et. al, *Shokuryo Kenkyusho Kenkyu Hokoku*, (22):284-90.

Further, the references teach that ascorbic acid can actually contribute to the browning problem, see for example, Z. Berk, *Braverman's Introduction To The Biochemistry of Foods*, 158-159, 1976; Kacem, et al., "Nonenzymatic Browning in Aseptically Packaged Orange Drinks: Effect of Ascorbic Acid, Amino Acids and Oxygen", *Journal of Food Science*, Vol. 52, No. 6, 1987, pp. 1668-1672.

For the foregoing reasons, there is a need to identify beverage formulations that contain calcium and Vitamin C, and are resistant to browning.

An object of the present invention is to provide calcium and Vitamin C containing beverage formulas which are resistant to browning particularly when packaged in oxygen permeable containers.

This and other objects will become apparent from the following detailed description.

SUMMARY OF THE INVENTION

The present invention relates to beverage composition;; containing calcium and Vitamin C, exhibiting reduced browning. The beverage compositions comprise:

a) from about 50 ppm to about 2000 ppm ascorbic acid;

b) from about 100 ppm to about 2,000 ppm erythorbic acid;

c) From about 0.03% to about 0.19% calcium;

d) a pH control system comprising an acidic buffering component, such that the pH of the composition is from about 3.1 to about 4.5;

e) from 0% to about 60% of a flavoring system;

f) an effective amount of a sweetening component; and g) water.

DETAILED DESCRIPTION OF THE INVENTION

Definitions

As used herein, the term "comprising" means various unnamed components can be conjointly employed in the beverages of this invention Accordingly, the terms "consisting essentially of" and "consisting of" are embodied in the term comprising.

As used herein the term "fruit flavors" refers to those flavors derived from the edible reproductive part of the seed plant, especially one having a sweet pulp associated with the seed, for example, apples, oranges, lemon, limes, etc. Also included within the term fruit flavor are synthetically prepared flavors made to simulate fruit flavors derived from natural sources. Particularly preferred fruit flavors are the citrus flavors including orange, tangerine, lemon, lime and grapefruit flavors. A variety of other fruit flavors can be used such as apple, grape, cherry, pineapple, coconut and the like. These fruit flavors can be derived from natural sources such as fruit juices and flavor oils or synthetically prepared. If desired, fruit juices, including orange, lemon, tangerine, lime, apple and grape can be used in a flavor component.

As used herein, the term "botanical flavor" refers to flavors derived from pans of the plant other than the fruit. As such, botanical flavors can include those flavors derived from nuts, bark, roots and leaves. Also included within this term are synthetically prepared flavors made to simulate botanical flavors derived from natural sources. Examples of botanical flavors include cola flavors, tea flavors, coffee and the like. These botanical flavors can be derived from natural sources such as essential oils and extracts or be synthetically prepared. Coffee, black tea, and herbal tea extracts can be used as the flavorant herein.

As used herein "single strength" refers to recommended drink strength, i.e. the ready-to-serve concentration of beverage compounds.

As used herein, the term "fruit juice" refers to citrus and non-citrus juices including some vegetable juices. The fruit juice can be provided as juice made from apple, passion fruit, cranberry, pear, peach, plum, apricot, nectarine, grape, cherry, currant, raspberry, gooseberry, blackberry, blueberry, strawberry, lemon, lime, mandarin, tangerine, orange, grapefruit, potato, tomato, lettuce, celery, spinach, cabbage, watercress, dandelion, rhubarb, carrot, beet, cucumber, pineapple, coconut, pomegranate, kiwi, mango, papaya, banana, watermelon and cantaloupe. The term "fruit juice" also refers to water extracted soluble solids, fruit juice concentrates, comminutes and purees.

As used herein, the term "Vitamin C" refers to L-ascorbic acid and dehydroascorbic acid. The term "erythorbic acid" refer to the isomer D-isoascorbic acid.

As used herein, the term "nutritionally-supplemental amount" is meant that the mineral and vitamin sources used in the practice of this invention provide a nourishing amount of minerals and vitamins. This is supplemental or in addition to the amount found in the average diet. This supplemental amount will provide from about 10% to about 200% of the Recommended Dietary Allowance (RDA). The RDA for vitamins and minerals is as defined in the United States of America (see Recommended Daily Dietary Allowance-Food and Nutrition Board, National Academy of Sciences-National Research Council).

As used herein the term "natural beverage" means whole, concentrated or diluted fruit juice from oranges, tangerines, lemons, mangos, papayas and other produce which is squeezed or crushed to supply a beverage which naturally contains an appreciable amount of Vitamin C. It may be fortified with added Vitamin C and mixtures of different juices may be made.

As used herein the term "manufactured beverage" means one that is wholly or predominately flavored with a natural or synthetic flavoring agent to which Vitamin C has been added to supply nearly all of its Vitamin C content.

As used herein the term "water" includes the total amount of water present in the composition. "Water" includes water from flavors, juice concentrates, sugar syrups and other sources, e.g. gum solutions. Water of hydration of calcium and other solids must be included.

As used herein the term "100% juice" means whole or concentrated juice from oranges, tangerines, mangos, papayas and other produce which is squeezed or crushed to supply a beverage.

All percentages herein are by weight unless otherwise specified.

BEVERAGE COMPONENTS

Recently, we have found that adding calcium accelerates arid intensifies the browning of Vitamin C containing beverages. When calcium is added to a beverage, several changes in solution chemistry occur. First, an acidic buffer component is needed as counterions for the added calcium and secondly, the ionic strength of the beverage is increased.

While not wishing to be bound by theory, it is believed that the incompatibility of Vitamin C and it's degradation products in the presence of the calcium causes the beverage to brown during storage. This browning is further accelerated if the beverage is packaged in oxygen permeable containers such as high density polyethylene (HDPE), low density polyethylene (LDPE), polypropylene, waxed cardboard and the like. This is especially the case when stored at ambient temperatures or above. The present invention makes it possible to add calcium to both natural and manufactured beverages, which naturally contain Vitamin C or which have been fortified with Vitamin C.

In accordance with the present invention, it has been found that the addition of erythorbic acid delays browning and significantly extends the shelf life of beverages containing calcium and Vitamin C.

All concentration limits of components of the present invention compositions provided herein are based on single strength beverages. The present invention also includes beverage concentrates, from which single strength beverages can be produced by the addition of water. Therefore, concentration limits for beverage concentrates are a simple multiple of the limits provided below, depending on the dilution factor used to make a single strength beverage from concentrate. Thus, for a 4×concentrate (diluted 3:1 by water to give a single strength beverage), the component concentration limits are four times those stated below, and for a 6×concentrate (diluted 5:1 by water to give a single strength beverage), the component concentration limits are five times those stated below.

The present invention also includes 100% juice products which naturally contain ascorbic acid. When 100% juice products are used the levels of erythorbic acid, the buffering component, calcium and any added ascorbic are within the limits listed below.

Ascorbic and Erythorbic Acid

One of the key nutritional components of the beverage of the present invention is ascorbic acid. It is preferred to provide from about 20% to about 200% of the RDA for Vitamin C. However, up to about 823%, prefixably from about 50% to about 200%, of the U.S. RDA of Vitamin C can be added to the present invention to provide protection during processing and storage. The quantity of ascorbic acid to be added is dependent on processing conditions and the amount of Vitamin C delivery desired after storage. Beverages of the present invention comprise from about 50 ppm to about 2,000 ppm, preferably from about 100 ppm to about 1,200 ppm, also preferably from about 200 ppm to about 1,000 ppm, more preferably from about 200 ppm to about 800 ppm and most preferably from about 300 ppm to about 600 ppm ascorbic acid.

For color stability, from about 100 ppm to about 2,000 ppm, preferably from about 100 ppm to about 1,200 ppm, also preferably from about 100 ppm to about 1,000 ppm, more preferably from about 250 ppm to about 800 ppm, and most preferably from about 300 ppm to about 800 ppm of erythorbic acid is incorporated to help stabilize the beverages of the present invention.

In applying the present invention to natural beverages the total ascorbic acid content is the combined amount of naturally present Vitamin C and added ascorbic acid. The total is such that the ascorbic acid content is within the above broad or preferred ranges.

Calcium

The beverages of the present invention also provide a nutritionally-supplemental amount of calcium. Suitable sources of calcium include calcium carbonate, calcium oxide, calcium hydroxide, calcium sulfate, calcium chloride, calcium phosphate, calcium hydrogen phosphate and calcium dihydrogen phosphate, as well as the respective organic salts of calcium, e.g., calcium titrate, calcium gluconate, calcium realate, calcium tanrate or calcium lactate and mixtures thereof. The most preferred calcium source is calcium citrate malate (CCM) complexes. Methods for making calcium citrate malate complexes and their compositions are described, for example, in Japanese Patent Specification SHO 56-97248, Kawai, published Aug. 5, 1981. Suitable methods for incorporating calcium into natural and manufactured beverages are described, for example in the following documents: U.S. Pat. No. 4,737,375, issued to Nakel et al.; May, 1988; U.S. Pat. No. 4,830,862 issued to Braun et al., May 1989; and U.S. Pat. No. 4,722,847 issued to Heckert (1988); U.S. Pat. No. 5,186,965 issued to Fox (1993); (incorporated herein by reference).

The beverage compositions of the present invention comprise from about 0.03% to about 0.19% calcium. Preferably the beverage compositions comprise from about 0.05% to about 0.16%, and also preferably from about 0.1% to about 0.15% calcium.

Acidic Buffering Component

When calcium is added to the beverage, additional counterions are needed to control the pH, to buffer the calcium, and to maintain an acceptable taste. Suitable acidic buffering components include citric acid, malic acid, Fumargo acid, tartaric acid, adipic acid, gluconic acid, phosphoric acid, succinic acid, acetic acid, lactic acid and mixtures thereof. These acidic buffering components can be present in their undissociated form or else as their respective salts (i.e. citrate, realate, phosphate, gluconate, lactate, etc.) Particularly preferred acidic buffering components comprise citric acid, malic acid, phosphoric acid, lactic acid, fumaric acid and mixtures thereof.

For the purpose of the present invention, the level of the acidic buffering component is dependent on the particular composition of the buffering component, the level of calcium included, as well as the mouthfeel and taste of the beverage. Typically an amount is added such that the beverage composition has a pH of from about 3.1 to about 4.5, preferably from about 3.3 to about 4.5, and more preferably from about 3.4 to about 4.3. A level of from about 0.01% to about 4%, preferably from about 0.1% to about 3%, and more, preferably from about 0.6% to about 2% of an acidic buffering component, calculated as the free acid, is sufficient to achieve this pH.

The total amount of the acid buffering component includes the amount of buffering components naturally present in juice along with any added acidic buffering component.

Flavor Component

The particular amount of the flavor component effective for imparting flavor characteristics to the beverage depends upon the flavor(s) selected, the flavor impression desired and the form of the flavor.

The flavoring system can comprise a fruit juice, a fruit flavor, a botanical flavor or mixtures thereof. In particular the combination of tea flavors, preferably green tea or black tea flavors, together with fruit juices have an appealing taste. Preferred fruit juices and fruit flavors are apple, pear, lemon, lime, mandarin, grapefruit, cranberry, orange, strawberry, grape, kiwi, pineapple, tangerine, passion fruit, mango, guava, raspberry, and cherry. Citrus flavors and juices, preferably grapefruit, orange, lemon, lime, mandarin, tangerine: and juices of mango, passion fruit, and guava, or mixtures thereof are most preferred.

The fruit flavors can be derived from natural sources such as fruit juices and flavor oils, or else be synthetically prepared.

The flavor component can also comprise a blend of various flavors e.g. lemon and time flavors, citrus flavors and selected spices (the typical cola soft drink flavor) etc. If desired the flavor in the flavor component may be formed into emulsion droplets which are then dispersed in the beverage drink. Because these droplets usually have a specific gravity less than that of water and would therefore form a separate phase, weighting agents (which can also act as clouding agents) can be used to keep the emulsion droplets dispersed in the beverage. Examples of such weighting agents are brominated vegetable oils (BVO) and resin esters, in particular the ester gums. See L.F. Green, Developments in Soft Drinks Technology, Vol. 1 (Applied Science Publishers Ltd. 1978) pp. 87-93 for a further description of the use of weighting and clouding agents in liquid beverages.

The fruit juice can be incorporated into the beverage as a single strength juice or puree, or as a fruit juice concentrate. The fruit juices are preferably present in an amount of from 0% to about 60%, preferably from about 3% to about 35%, and more preferably from about 5% to about 10% of the beverage.

Beverages of the present invention which are substantially free of fruit juice typically comprise flavor components which are no more than about 3% of the beverage, preferably such flavor component comprises at least 0.001% of the beverage, and typically from about 0.01% to about 2%, and preferably from about 0.02% to about 0.07% of the beverage.

Sweetener Component

The beverage product of the present invention contains a sweetener in an amount sufficient to provide the desired flavor and texture. The beverage product preferably comprise a carbohydrate sweetener.

The carbohydrate sweetener is preferably a mono- and or disaccharide sugar such as maltose, lactose, galactose, sucrose, glucose, fructose, invert sugars and mixtures thereof. Especially preferred is fructose. All of these sugars are typically incorporated into the beverage product as syrups, but they can likewise be incorporated in other terms, e.g. solid form. These sugars are also provided to some extent by other added materials in the beverage product such as fruit juice, optional flavorants, and the like.

Fructose for use in the beverage product can be provided as liquid fructose, high fructose corn syrup, dry fructose or fructose syrup; it is preferably provided as high fructose corn syrup wherein at least about 42% by weight of the solids in the syrup are fructose. Preferred fructose sources are high fructose corn syrups wherein 42% of the solids in the syrup are fructose (HFCS 42), high fructose corn syrup wherein 55% of the solids in the syrup are fructose (HFCS 55), and liquid fructose (contains 99% fructose solids), all of which are available from A. E. Staley Manufacturing, Decatur, Ill.

Sugar alcohols can also be used in the beverages of the present invention. These sugar alcohols include sorbitol, mannitol, and xylitol. Usually, however, these materials are not used as the sole sweetener because in the levels required to sweeten beverages, they have a side effect of flatulence or related gastrointestinal related problems.

For diet beverages, non-caloric sweeteners can be used. Examples of such sweeteners include aspartame, saccharine, cyclamates, acetosulfam-K, L-aspartyl-L-phenylalanine lower alkyl ester sweeteners, L-aspartyl-D-alanine amides as disclosed in U.S. Pat. No. 4,411,925 to Brennan, et al (1983), L-aspartyl-D-serine amides disclosed in U.S. 4,399,163 to Brennan et al (1983), L-aspartyl-hydroxymethylalkane amide sweeteners disclosed in U.S. Pat. No. 4,338,346 issued to Brand (1982), L-aspartyl-1-hydroxyethylalkane amide sweeteners disclosed in U.S. Pat. No. 4,423,029 to Rizzi (1983), glycerins, synthetic alkoxy aromatics, etc. Lo Hah Guo juice which contains a natural sweetener can also be used as a sweetener.

The amount of sweetener effective in the beverages of the present invention depends upon the particular sweeteners used and the sweetness intensity desired. For non-caloric sweeteners this amount varies depending upon the sweetness intensity of the particular sweetener. Preferred beverages contain from 9% to about 13% by weight sugar. In determining the amount of sugar of the present invention, any sugar or other sweetener present in the flavor component, such as fruit juice, is also included.

For carbohydrates or sugars, the amount of sweetener can be from about 1% to about 20%, and preferably from 6% to about 14% by weight for single strength beverages. The amount for artificial sweeteners generally ranges from about 0.001 to about 2%, preferably from about 0.01% to about 0.1%.

Mixtures of carbohydrates, low calorie sweeteners and artificial sweeteners can also be used in the present invention, i.e., a mixture of aspartame and sucrose or high fructose corn syrup can be used. This provides a reduced calorie beverage. Another way of measuring the amount of sweeteners or mixtures thereof is to compare the sweetening power to sucrose. The sweetening power is typically equal to a solution comprising from about 1% to about 20%, preferably from about 6% to about 14% and more preferably from about 9% to about 13% sucrose.

Water

Beverages according to the present invention typically contain from about 75% to about 99% water. Preferably the beverages of the present invention contain from about 80% to about 90% water. If desired the water in the present invention can be carbonated. The amount of carbon dioxide introduced into he beverage can depend upon the particular flavor system used and the amount of carbonation desired. If carbonation is desired carbonated beverages of the present invention contain from about 1 to about 4.5 volumes, preferably 1 to about 3.5 volumes of carbon dioxide.

The carbonated beverage can then be placed in a suitable container and sealed. See L. F. Green, Developments in Soft Drinks Technology, Vol. 1 (Applied Science Publishers Ltd. 1978), pp. 102–107, for a further description of beverage making, in particular the process for carbonation.

Other Ingredients

Other minor ingredients can be included in the beverages of the present invention. Such ingredients include benzoic acid, sorbic acid and salts thereof, natural or synthetically prepared colors, salt (e.g. sodium chloride) and other flavor enhancers. Gums, emulsifiers and oils can also be included in the beverage for texture and opacity purposes. Typical ingredients include guar gum, xanthan gum, alginates, mono- and di- glycerides, lecithin, starches, pectin, pulp, cotton seed oil and vegetable oil.

The beverage composition can additionally comprise from 0% to about 110% of the U.S. RDA of vitamins and minerals such that the vitamins and minerals are chemically and physically compatible with the essential elements of the beverage composition. Especially preferred are Vitamin A, and provitamins thereof (beta-carotene), Vitamins D, E, B 1, B6, B12, niacin, pantothenic acid folic acid biotin, thiamin, magnesium, potassium, sodium, iron, zinc and mixtures thereof.

Beverage Preparation

The beverages of the present invention can be prepared by standard beverage formulation techniques. Although carbonated beverages are within the scope of the present invention, particular emphasis is given to the making of non-carbonated beverages. It should be understood, however, that non-carbonated techniques, when appropriately modified, are also applicable to carbonated beverages. Also, while the following description is with reference to sugar containing beverages, diet beverages containing non caloric and artificial sweeteners can also be prepared by appropriate modification. Beverages can include dry beverage mixes which are made by mixing flavors, sweeteners, and thickeners, emulsifiers and any optional ingredients. The ingredients are added to the water and mixed in conventional equipment.

In making the beverages, a beverage concentrate is usually formed containing from about 30% to about 70% by weight water. This beverage concentrate typically contains the emulsified or water-soluble flavors, emulsion stabilizing agents, and weighting agents if needed, any color desired and suitable preservatives. After the concentrate is formed, sugar and water are then added to make a beverage syrup. This beverage syrup is then mixed with an appropriate quantity of water to form the finished beverage.

The calcium source and the acids can be added at various points in this beverage concentrate-beverage syrup-beverage making process. The calcium source and the acidic buffering component are preferably added at the same point in this process, but can also be added at different points.

Methods for making natural and manufactured calcium containing beverages, for example are described in U.S. Pat. No. 4,737,375 to Nakel et. al., U.S. Pat. No. 4,830,862 to Braun et al. and U.S. Pat. No. 4,722,847 to Heckert et. al., which are herein incorporated by reference.

A method for preparing the beverage product herein is described as follows: to water are added thickeners, sugar syrup, acidic buffering components, calcium, flavorants including juice concentrate, water soluble vitamins, including Vitamin C, erythorbic acid, and preservative. An oil in water emulsion, which provides opacity and texture to the beverage product can be added.

The key aspect of the process of the present invention is mixing the requisite materials, in the requisite amounts, to achieve the beverage compositions of the present invention. Other well known and conventional variations of the above described beverage formulation technique can, therefore, be used to prepare the beverages herein.

The following examples are given to illustrate the invention and are not intended to limit it in any way.

EXAMPLES

Example 1

| Ingredient | Wt. % |
|---|---|
| Water | 84.30 |
| HFCS 55 | 14.10 |
| Malic Acid | 0.447 |
| Citric Acid | 0.609 |
| Sodium Citrate | 0.108 |
| Tricalcium Phosphate | 0.022 |
| Potassium Sorbate | 0.080 |
| Calcium Hydroxide | 0.247 |
| Erythorbic Acid | 0.043 |
| Ascorbic Acid | 0.043 |
| | 100.00 |

A beverage having the above composition is prepared as follows: Water and high fructose corn syrup (HFCS) are blended together. Citric and malic acids are added to the water and sugar mixture until dissolved. Sodium citrate, tricalcium phosphate, and potassium sorbate are then added and dissolved. Calcium hydroxide is added and mixed until dissolved. Finally ascorbic acid, and erythorbic acid are added and mixed.

The above example contains no flavor component. However, a fruit flavored beverage may be obtained by adding from about 0.01% to about 3% of a flavor component.

Example 2

| Ingredient | Wt. % |
|---|---|
| Thickener | 0.1 |
| Colorants | 0.0014 |
| Fruit Juice Concentrate/Flavor oils | 1.1 |
| Water | 83.55 |
| HFCS 55 | 13.8 |
| Malic Acid | 0.42 |
| Citric Acid | 0.62 |
| Calcium Hydroxide | 0.24 |
| Potassium Sorbate | 0.075 |
| Erythorbic Acid | 0.047 |
| Ascorbic Acid | 0.053 |
| | 100.00 |

A beverage having the above composition is prepared by adding water and then mixing in the gums to hydrate them completely. High fructose corn syrup, citric and malic acid, and calcium sources are then added with mixing. Colorants are added, followed by fruit juice concentrate and flavor oil. Potassium sorbate, ascorbic acid and erythorbic acid are added to complete the finished product making.

Example 3

A beverage is prepared according to the procedure of example 2 except the beverage further comprises 0.00022% thiamin hydrochloride and 0.12% beta-carotene emulsion.

Example 4

| Ingredient | Wt. % |
|---|---|
| Orange juice (contains 0.05% ascorbic acid and .66% acidity as citric acid) | 99.3 |
| Calcium hydroxide | 0.24 |
| Erythorbic acid | 0.05 |
| Malic acid | 0.4 |
| | 100.0 |

To freshly squeezed orange juice is added calcium hydroxide, malic acid and erythorbic acid with stirring.

What is claimed is:
1. A beverage composition comprising:
   (a) from about 50 ppm to about 2000 ppm ascorbic acid;
   (b) from about 100 ppm to about 2,000 ppm erythorbic acid;
   (c) from about 0.03% to about 0.19% calcium;
   (d) a pH control system comprising an acidic buffering component, such that the pH of the composition is from about 3.1 to about 4.5;
   (e) from 0% to about 60% of a flavoring system,
   (f) an effective amount of a sweetening component; and
   (g) water.
2. A beverage composition according to claim 1 wherein said ascorbic acid is from about 100 ppm to about 1,200 ppm and said erythorbic acid is from about 100 ppm to about 1,200 ppm.
3. A beverage composition according to claim 2 wherein said ascorbic acid is from about 100 ppm to about 1,200 ppm; said erythorbic acid is from about 100 ppm to about 1,200 ppm; said calcium is from about 0.05% to about 0.16%; and said pH control system comprises an acidic buffering component, such that the pH of the composition is from about 3.3 to about 4.5.
4. A beverage composition according to claim 3 wherein said ascorbic acid is from about 200 ppm to about 1,000 ppm and said erythorbic is from about 100 ppm to about 1,000 ppm.
5. A beverage composition according to claim 3 wherein said ascorbic acid is from about 200 ppm to about 800 ppm and said erythorbic acid is from about 250 ppm to about 800 ppm erythorbic acid.
6. A beverage composition according to claim 3 wherein said ascorbic acid is from about 300 ppm to about 600 ppm and said erythorbic acid is from about 300 ppm to about 800 ppm erythorbic acid.
7. A beverage composition according to claim 3 wherein said calcium is from about 0.1% to about 0.16%; and said pH control system comprises an acidic buffering component, such that the pH of the composition is from about 3.4 to 4.5.

8. A beverage composition according to claim 7 wherein said ascorbic acid is from about 200 ppm to about 800 ppm and said erythorbic is from about 250 ppm to about 800 ppm.

9. A beverage composition according to claim 7 wherein said ascorbic acid is from about 300 ppm to about 600 ppm and said erythorbic acid is from about 300 ppm to about 800 ppm.

10. A beverage composition according to claim 3 wherein the calcium is selected from the group consisting of calcium carbonate, calcium hydroxide, calcium phosphate, calcium lactate, calcium chloride, calcium realate, calcium citrate, or mixtures thereof, and said acidic buffering component is selected from tje grpi cpmsostomg pf citric acid, malic acid, phosphoric acid, lactic acid, fumaric acid and mixtures thereof.

11. A beverage composition according to claim 3 wherein the sweetening component is from the group consisting of about 6% to about 14% and is selected from maltose, glucose, lactose, sucrose, fructose, high fructose corn syrup, liquid fructose, and mixtures thereof.

12. A beverage according to claim 11 wherein the flavor component comprising from 0.01 to 60% fruit juice, fruit juice concentrate, fruit flavor, and mixtures thereof, wherein said flavor component is selected from the group consisting of tangerine, orange, mango, guava, lemon, lime, mandarin, papaya, passion fruit, and mixtures thereof.

13. A beverage composition according to claim 3 wherein said sweetener component is from about 0.001% to about 2% and the sweetener composition is a non-caloric sweetener.

14. A beverage composition according to claim 1 wherein said ascorbic acid is from about 200 ppm to about 1,000 ppm and said erythorbic is from about 100 ppm to about 1,000 ppm.

15. A beverage composition according to claim 1 wherein said ascorbic acid is from about 200 ppm to about 800 ppm and said erythorbic acid is from about 250 ppm to about 800 ppm.

16. A beverage composition according to claim 1 further comprising a mineral supplementation, vitamin supplementation or mixtures thereof.

17. A 100% juice product comprising:
(a) from about 50 ppm to about 2000 ppm ascorbic acid;
(b) from about 100 ppm to about 2,000 ppm erythorbic acid;
(c) from about 0.03% to about 0.19% calcium;
(d) a pH control system comprising an acidic buffering component, such that the pH of the composition is from about 3.1 to about 4.5.

18. Composition according to claim 17 wherein said fruit juice is selected from the group consisting of tangerine, orange, mango, guava, lemon, lime, mandarin, papaya, passion fruit, and mixtures thereof.

* * * * *